United States Patent
Hein

(10) Patent No.: US 8,448,951 B2
(45) Date of Patent: May 28, 2013

(54) CLOSED RIDE CONTROL SYSTEM FOR VEHICLES

(75) Inventor: Dierk Hein, Wedemark (DE)

(73) Assignee: Continental Teves AG & Co. oHG (DE)

( * ) Notice: Subject to any disclaimer, the term of this patent is extended or adjusted under 35 U.S.C. 154(b) by 24 days.

(21) Appl. No.: 13/201,007

(22) PCT Filed: Dec. 1, 2009

(86) PCT No.: PCT/EP2009/066106
§ 371 (c)(1),
(2), (4) Date: Aug. 11, 2011

(87) PCT Pub. No.: WO2010/091751
PCT Pub. Date: Aug. 19, 2010

(65) Prior Publication Data
US 2011/0316248 A1  Dec. 29, 2011

(30) Foreign Application Priority Data
Feb. 12, 2009  (DE) .......................... 10 2009 003 472

(51) Int. Cl.
*B60G 17/04*  (2006.01)
*B60G 11/26*  (2006.01)

(52) U.S. Cl.
USPC ................ 280/5.514; 280/6.157; 280/124.16; 280/124.161

(58) Field of Classification Search
USPC ............. 280/5.514, 6.157, 124.157, 124.159, 280/124.16, 124.161; 267/64.11, 64.16, 64.28
See application file for complete search history.

(56) References Cited

U.S. PATENT DOCUMENTS

| | | | | |
|---|---|---|---|---|
| 4,858,895 A | * | 8/1989 | Buma et al. | 267/64.16 |
| 6,098,967 A | * | 8/2000 | Folchert | 267/64.16 |
| 6,224,044 B1 | * | 5/2001 | Heilenkotter et al. | 267/64.16 |
| 6,817,600 B2 | * | 11/2004 | Ocker et al. | 267/274 |
| 6,824,145 B2 | * | 11/2004 | Behmenburg | 280/6.157 |
| 7,607,672 B2 | * | 10/2009 | Suzuki et al. | 280/124.16 |
| 7,624,994 B2 | * | 12/2009 | Stegmann | 280/5.514 |
| 7,957,865 B2 | * | 6/2011 | Brookes et al. | 701/37 |
| 2002/0136645 A1 | | 9/2002 | Folchert et al. | |
| 2004/0026835 A1 | | 2/2004 | Folchert | |
| 2005/0017474 A1 | * | 1/2005 | Heer | 280/124.16 |
| 2006/0006733 A1 | * | 1/2006 | Geiger et al. | 303/3 |
| 2006/0043691 A1 | | 3/2006 | Geiger | |
| 2011/0316248 A1 | * | 12/2011 | Hein | 280/124.159 |

FOREIGN PATENT DOCUMENTS

| | | |
|---|---|---|
| DE | 10231251 | 8/2003 |
| DE | 10240357 | 3/2004 |
| DE | 102004056883 | 6/2006 |
| EP | 1243447 | 9/2002 |

OTHER PUBLICATIONS

International Search Report issued in PCT/EP2009/066106, filed Dec. 1, 2001, mailed Feb. 26, 2010.

* cited by examiner

*Primary Examiner* — Joseph Rocco
(74) *Attorney, Agent, or Firm* — RatnerPrestia

(57) ABSTRACT

A closed ride control system for vehicles by which a vehicle body is suspended with respect to at least one vehicle axle and which includes the following components: pressure medium chambers which are connected via branches to a pressure medium line, a compressor, an air dryer which is arranged in a pressure medium line, a pressure medium reservoir which is connected via the compressor to the pressure medium chambers, and a non-return valve arranged in the pressure medium line between an outlet of the air dryer and the directional valve in order to connect the outlet of the air dryer to the pressure medium reservoir.

13 Claims, 3 Drawing Sheets

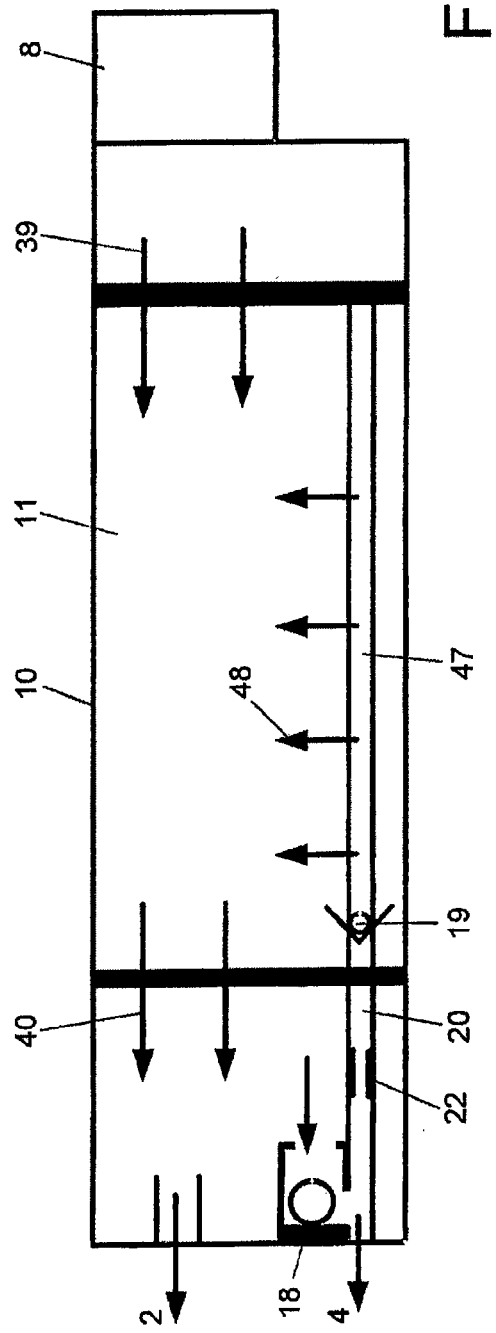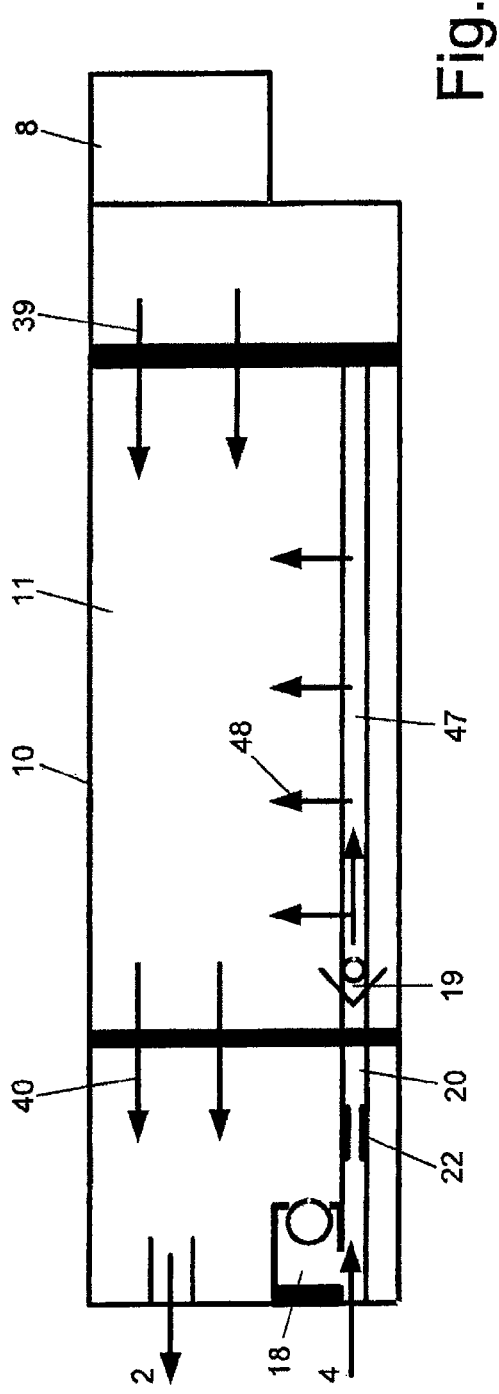

CLOSED RIDE CONTROL SYSTEM FOR VEHICLES

CROSS REFERENCE TO RELATED APPLICATIONS

This patent application is a U.S. National Phase Patent Application of PCT International Application No. PCT/EP2009/066106, filed Dec. 1, 2009, which claims priority to German Patent Application No. 10 2009 003 472.2, filed Feb. 12, 2009, the contents of such applications being incorporated by reference herein.

FIELD OF THE INVENTION

The invention relates to a closed ride control system for vehicles by which a vehicle body is suspended with respect to at least one vehicle axle.

BACKGROUND OF THE INVENTION

A closed ride control system for vehicles of the type mentioned in the introduction is described in the European patent application EP 1 243 447 A2, which is incorporated by reference. The closed ride control device known from that document comprises two or four controllable directional valves, a pressure medium reservoir and at least two pressure medium chambers, each having a controllable directional valve. With this ride control system, pressure medium can be transferred from the pressure medium chambers to the pressure medium reservoir and vice versa. Furthermore, air from the atmosphere can be conducted into the pressure medium reservoir, the compressed air being dried in an air dryer before entering the pressure medium reservoir. In order to regenerate the air dryer, pressure medium from the pressure medium reservoir can be decompressed via a throttle and conducted to the atmosphere through the air dryer via a discharge valve, in the opposite direction in comparison to the air-drying. The regeneration of the dryer in the opposite direction is disadvantageous because it is less effective and is therefore associated with a relatively high consumption of air. Furthermore, the system contains line paths which in certain operating states remain filled with moist air, which can be removed only subsequently by additional regeneration cycles.

According to the closed ride control system of DE 102 31 251 C1, which is incorporated by reference, direct filling of the air springs, which may occur, for example, after a long stationary period of the vehicle, is possible, since the compressor can draw air directly from the atmosphere via an additional line leading to its inlet, which air can be conducted to the air springs directly from the outlet of the compressor. In this case, however, the direct filling of the air springs is carried out with moist air which must subsequently be dried by means of suitable regeneration cycles.

The regeneration cycles required for the removal of the air humidity involve additional compressor running times, since the air must first be conveyed into the system and then discharged, which must be taken into account with regard to the total service life of the compressor. These additional compressor running times entail a reduction in the availability for use of the ride control system itself, since the compressor and valves are in use longer and for thermal self-protection must periodically be left unused. Additional drying of the system air during operation of the ride control system is possible only as the air is conveyed from the air springs to the accumulator. During the conveying of air from the accumulator to the air springs, the air is diverted to the air springs upstream of the dryer.

An air suspension system for a vehicle, in which air always flows through the dryer as it is conveyed by a compressor, and in which both the air drying and the regeneration of the dryer take place in the same direction of flow, is known from DE 102 40 357 A1, which is incorporated by reference. The structure of this system is complicated, since a compressed-air controlled 4/3-way valve, which can be moved to three switching positions as a function of the air pressure in the system, is arranged upstream of the dryer, the first of which switching positions opens a passage of relatively large cross section through the 4/3-way valve, while the second switching position opens a throttled passage cross section and the third switching position releases a throttled discharge to the atmosphere. A regeneration of the dryer takes place in this third switching position. The compressed air for switching the 4/3-way valve is branched off upstream of the dryer and therefore contains moisture. This air cannot be dried by a system function since it is located in a part of the line without through-flow, entailing a risk of freezing-up of the 4/3-way valve, which also serves as a discharge valve.

SUMMARY OF THE INVENTION

Disclosed herein is a closed ride control system for vehicles which has a simple structure, requires little installation space, conducts air drawn from the environment through the dryer, has no paths which can be filled with moist air upstream of the dryer, and for which as small as possible a number of directional valves of simple construction is sufficient.

According to one aspect of the invention, a closed ride control system for vehicles by which a vehicle body is suspended with respect to at least one vehicle axle and which includes the following components:

a) pressure medium chambers which are connected via branches to a pressure medium line,
b) a compressor,
c) an air dryer which is arranged in a pressure medium line,
d) a pressure medium reservoir which is connected via the compressor to the pressure medium chambers in such a manner that
e) pressure medium can be transferred from the pressure medium reservoir via the compressor into each pressure medium chamber, the compressor inlet then being connected via a pressure medium line through-connected by means of a directional valve to the pressure medium reservoir, and the compressor outlet then being connected via a pressure medium line through-connected by means of a directional valve to one or more of the pressure medium chambers,
f) pressure medium can be transferred from each pressure medium chamber via the compressor to the pressure medium reservoir, the compressor inlet then being connected via a pressure medium line through-connected by means of the directional valve to one or more of the pressure medium chambers, and the compressor outlet then being connected via a pressure medium line through-connected by means of the directional valve to the pressure medium reservoir, and that
g) a pressure medium line which is connectable to the atmosphere and is connectable via a directional valve, the directional valve and a pressure medium line to the compressor inlet, and is connectable via the directional valve, the pressure medium line and the directional valve to the pressure medium reservoir, h) wherein a non-return valve is arranged in the pressure medium line between an outlet of the air dryer and the directional valve in order to connect the outlet of the air dryer to the pressure medium reservoir, in that the pressure medium line branches off from the pressure medium line at the outlet of the air dryer and upstream of the non-return valve, and in that a non-return valve and/or a throttle is/are arranged in a pressure medium line, which pressure medium line branches off from the pressure medium line at a point between the non-return valve and the directional valve and opens in the air dryer, the non-return valve blocking in the direction from the air dryer to the connection to the pressure medium line.

In the ride control system for vehicles by which a vehicle body is suspended with respect to at least one vehicle axle, according to aspects of the invention, a non-return valve is arranged in the pressure medium line between an outlet of the air dryer and the directional valve for connecting the outlet of the air dryer to the pressure medium reservoir; the pressure medium line to the directional valve which controls the supply and discharge of compressed air in the pressure medium line to the pressure medium chambers branches off from the pressure medium line to the pressure medium reservoir at the outlet of the air dryer and upstream of the aforementioned non-return valve; a further non-return valve and/or a throttle is/are arranged in a pressure medium line which branches off at a point between the first non-return valve and the directional valve for connecting the pressure medium line to the pressure medium reservoir and opens in the air dryer, this further non-return valve blocking in the direction from the air dryer to the point between the first non-return valve and the directional valve for connecting the pressure medium line to the pressure medium reservoir.

An advantage of the ride control system according to aspects of the invention can be seen in the fact that only very few controllable directional valves are required, whereby installation space and costs are saved. A further advantage is that the air drawn from the environment is always dried and that no air paths with moist air requiring additional drying or regeneration cycles are present. A reduced compressor service life combined with increased system availability is thereby made possible. The standard regeneration principle with throttle and non-return valve is retained, so that, in addition, only software changes in the control system for the normal filling of the air springs and/or of the accumulator for compressed air are required. Furthermore, additional system drying cycles can advantageously be omitted.

According to a development of the invention, it is provided that the throttle is arranged in the line which branches off at a point between the first non-return valve and the directional valve for connecting the pressure medium line to the pressure medium reservoir. The advantage of this arrangement is that the throttle can be arranged without difficulty in the existing components of the ride control system.

According to a development of the invention, the pressure medium line in which the throttle and the further non-return valve are arranged may be connected to the inlet of the air dryer or directly to a dryer bed of the air dryer. The advantage of the development of the invention with compressed air conducted directly into a dryer bed of the air dryer is that the compressed air is conducted into the dryer bed transversely to the drying flow direction of the air dryer, whereby the regeneration of the dryer is improved.

For this purpose the air dryer may have a dome which projects into the dryer bed and is connected to the compressed air line in which the throttle and the further non-return valve are arranged, the dome having at least one opening to the dryer bed. In this case the further non-return valve and the throttle are arranged upstream of the inlet to the dome.

The advantage of the last-mentioned developments of the invention is that the dryer can be combined with the dome, the non-return valves and the throttle to form a constructionally simple unit requiring little installation space.

According to another development of the invention, it is provided that the pressure medium line from the pressure medium reservoir to the compressor, and the pressure medium line from the pressure medium chambers to the compressor, are brought together at a point located upstream of the compressor inlet, and that non-return valves which block in the direction of the pressure medium reservoir and of the pressure medium chambers are arranged in the pressure medium lines.

The advantage of this development can be seen in the fact that, at a certain position of the directional valves arranged in these pressure medium lines, a flow of compressed air from the pressure medium chambers to the pressure medium reservoir is impossible, regardless of whether the air pressure in the pressure medium chambers is higher or lower than the air pressure in the pressure medium reservoir. In the rest state of the ride control system, that is, when no control is taking place, the controllable directional valves may, for example, be transferred to this rest state, so that an unintended flow of compressed air between the pressure medium chambers and the pressure medium reservoir cannot take place. In addition, as a result of such a defined state of the controllable directional valves, a measurement of the pressure in the pressure medium chambers by means of a pressure sensor is possible in a simple manner. The advantages obtained with the development are achieved while preserving all the functions of the ride control system. In particular, it continues to be possible to discharge compressed air to the atmosphere from the pressure medium reservoir via the air dryer in order to regenerate the air dryer.

According to a development of the invention, it is provided that a suction line is connected to the compressor inlet via a non-return valve blocking towards the atmosphere.

This arrangement is associated with the advantage that it makes possible rapid, direct filling of the air springs, which is desirable, for example, after a long stationary period of the vehicle. Although this rapid filling of the air springs is then possible only with moist air, this moist air can subsequently be dried by means of suitable drying cycles, so that no moist air remains in the system.

According to another development of the invention, the directional valves between the pressure medium reservoir and the compressor, and between the pressure medium line connectable to the atmosphere and the compressor, are switched in such a manner that aspiration of air from the atmosphere can take place only via the suction line connected via the non-return valve to the inlet of the compressor, and discharging of compressed air to the atmosphere can take place only via the from the outlet of the air dryer to the directional valve, and from there via a further directional valve through the discharge line.

The advantage of the development of the invention is that the air aspirated by the compressor is then always directed through the air dryer, and that the air discharged to the atmosphere via the discharge line is also directed through the air dryer, so that the air dryer is thereby regenerated.

An advantageous development of the invention consists in the fact that the directional valve between the pressure medium reservoir and the compressor, and the directional valve between the discharge line and the compressor, are in the form of 3/2-way valves, and the directional valves to the pressure medium chambers and in the discharge line are in the form of 2/2-way valves.

The advantage of this development is that the inventive ride control system requires only a minimum of directional valves of simple construction and non-return valves, reducing installation space and lowering manufacturing costs.

An advantageous development of the invention is that a pressure medium line with a non-return valve which blocks in the direction of the pressure medium line to the pressure medium chambers, a pressure medium line parallel thereto with a throttle between the air dryer inlet and the pressure medium line to the pressure medium chambers, and a further non-return valve, are arranged in the pressure medium line between the connections of the pressure medium lines to the non-return valve and to the throttle and to the air dryer outlet.

The advantage of the development is that a pressure medium flow between the pressure medium chambers and the pressure medium reservoir which bypasses the compressor and passes through the air dryer is possible, so that the major part of the moist air remaining during regeneration in the pressure medium line to the pressure medium chambers is dried.

BRIEF DESCRIPTION OF THE DRAWINGS

The invention is explained further below with reference to an exemplary embodiment represented in the drawing, in which:

FIG. 2 is a schematic sectional view of an air dryer during a drying phase, FIG. 3 is a schematic sectional view of an air dryer during a regeneration phase.

DETAILED DESCRIPTION OF THE PREFERRED EMBODIMENTS

Figure 1:
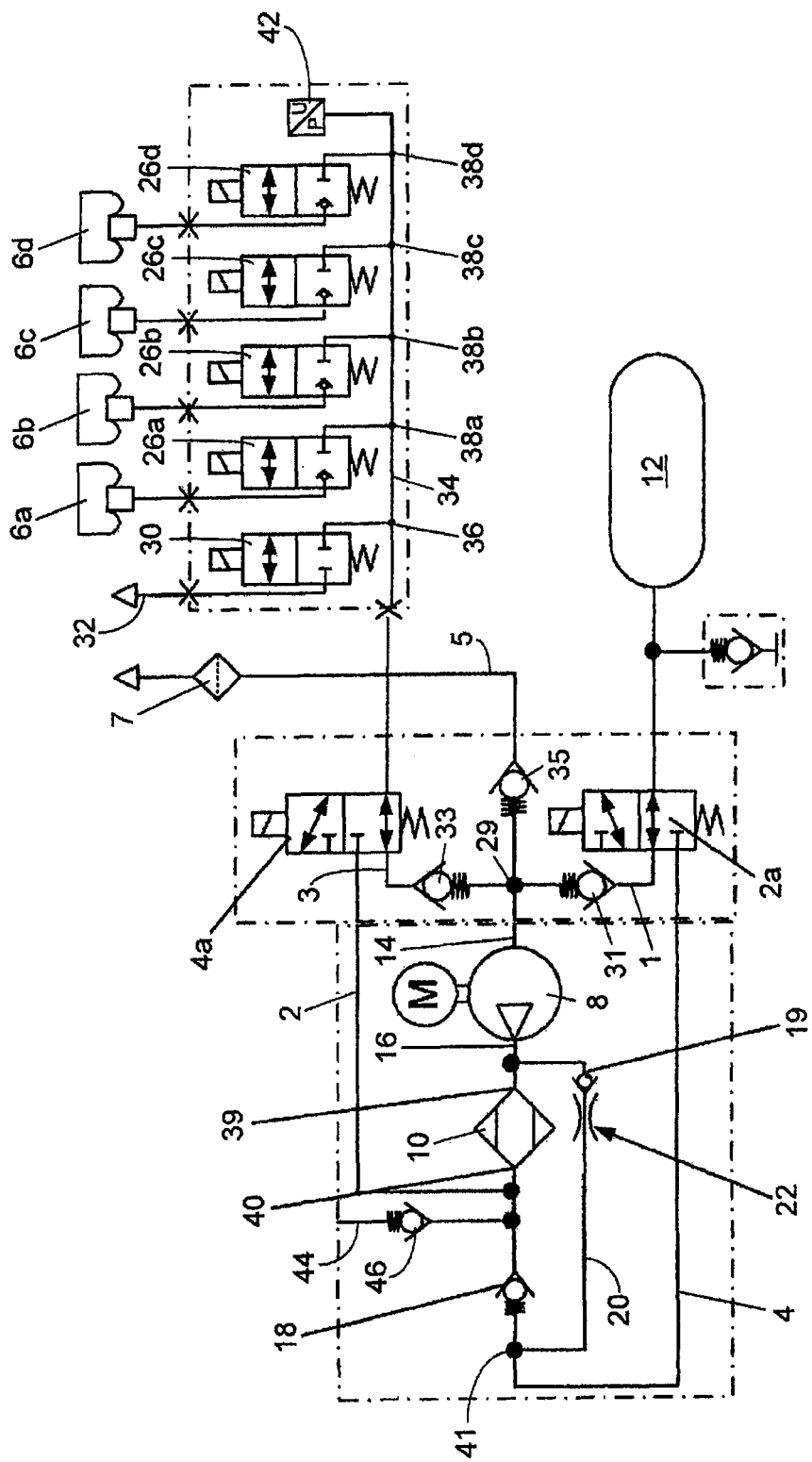
FIG. 1 is a pneumatic circuit diagram of the closed ride control system according to aspects of the invention.

FIG. 1 shows in a schematic representation a ride control system which is usually operated with compressed air and which includes pressure medium chambers in the form of air springs 6a to 6d, a compressor 8, an air dryer 10 and a pressure medium reservoir 12. The pressure medium reservoir 12 is connected via a third pressure medium line 1, which passes via a first 3/2-way valve 2a and a third non-return valve 31, to a compressor inlet 14, and also via the controllable first 3/2-way valve 2a and a second pressure medium line 4, in which a first non-return valve 18 and the air dryer 10 are arranged, to a compressor outlet 16. The first non-return valve 18 is arranged so as to open towards the pressure medium reservoir 12.

A seventh pressure medium line 20, which leads via a throttle 22 and a second non-return valve 19 to the connection between the compressor outlet 16 and the air dryer outlet 40, branches off downstream of the first non-return valve 18. The second non-return valve 19 is arranged so as to open in the direction of the connection between the air dryer outlet 40 and the compressor outlet 16.

The air dryer outlet 40 is connected via a fourth pressure medium line 2 to a further second 3/2-way valve 4a which is connected via a fifth pressure medium line 3 and a fourth non-return valve 33 at a point 29 at which the third pressure medium line 1 and the fifth pressure medium line 3 are brought together and from where a connection to the compressor inlet 14 exists.

The third and fourth non-return valves 31 and 33 are arranged so as to open in the direction of the compressor inlet 14 and of the point 29.

The second 3/2-way valve 4a is further connected to a first pressure medium line 34, which is connectable via branches 38a to 38d and 2/2-way valves 26a to 26d to the air springs 6a to 6d. A sixth pressure medium line 32, in which is arranged a third 2/2-way valve 30 by means of which air can be selectively aspirated from and discharged to the atmosphere, branches off from a point 36.

Furthermore, a pressure sensor 42 is connected to the first pressure medium line 34. A suction line 5, in which are arranged an air filter 7 and a fifth non-return valve 35 opening towards the compressor inlet 14, also leads to the compressor inlet 14.

Rapid filling of the air springs 6a to 6d and/or of the pressure medium reservoir 12 with air from the atmosphere, for example after a long stationary period of the vehicle, can be achieved in that the compressor 8 is switched on, the first and second 3/2-way valves 2a and 4a are switched to transmit in the direction of the pressure medium reservoir 12 and/or of the first pressure medium line 34, and the 3/2-way valves 26a to 26d are moved simultaneously or successively to the open position. Because the air compressed by the compressor 8 passes first through the air dryer 10 and only afterwards into the fourth and second pressure medium lines 2 and 4, the ride control system is filled only with dried air.

If compressed air is to be conveyed from one or more of the air springs 6a to 6d to the pressure medium reservoir 12, one or more of the 2/2-way valves 26a to 26d is/are opened, the first 3/2-way valve 2a is moved to the position to transmit from the second pressure medium line 4 to the pressure medium reservoir 12, and the compressor 8 is set in operation, so that the compressed air from one or more of the air springs 6a to 6d reaches the compressor 8 through the first pressure medium line 34, the second 3/2-way valve 4a and the fourth non-return valve 33, and is conveyed from there through the air dryer 10 and the first non-return valve 18 to the pressure medium reservoir 12.

If, conversely, compressed air is to be conveyed from the pressure medium reservoir 12 to one or more of the air springs 6a to 6d, the first 3/2-way valve 2a remains in the position illustrated, while the second 3/2-way valve 4a is moved to the position in which the fourth pressure medium line 2 is connected to the first pressure medium line 34, so that compressed air can be conveyed by the compressor 8 from the pressure medium reservoir 12 via the air dryer 10, the fourth pressure medium line 2, and the second 3/2-way valve 4a to one or more of the air springs 6a to 6d, according to the position of the 2/2-way valves 26a to 26d.

Accordingly, both when compressed air is being conveyed from the air springs 6a to 6d to the pressure medium reservoir 12 and, inversely, from the pressure medium reservoir 12 to the air springs 6a to 6d, residual moisture in the line region between the compressor inlet 14 and the third, fourth and fifth non-return valves 31, 33, 35 is conveyed through the air dryer 10 and removed from the system.

In order to regenerate the air dryer 10, the first 3/2-way valve 2a is moved to the position transmitting from the pressure medium reservoir 12 to the second pressure medium line 4, the second 3/2-way valve 4a is moved to the position transmitting from the fourth pressure medium line 2 to the first pressure medium line 34, and the third 2/2-way valve 30 is opened to the discharge line 32. The compressed air from the pressure medium reservoir 12 then flows via the second pressure medium line 4, the seventh pressure medium line 20, the throttle 22, and the second non-return valve 19 to the connection between the compressor outlet 16 and the air dryer inlet 39, through the air dryer 10, the fourth pressure medium line 2, the second 3/2-way valve 4a, the first pressure medium line 34 and the third 2/2-way valve 30 and via the discharge line 32 into the atmosphere.

Through the decompression of the compressed air as a result of the throttle effect, an improved regeneration effect of the dryer granulate located in the air dryer 10 is achieved, that is, a relatively high drying effect is obtained with relatively little consumption of compressed air.

A line 44 for an external connection, in which a non-return valve 46 is arranged, may be provided between the air dryer outlet 40 and the first non-return valve 18.

A compact construction of the air dryer 10, in which the compressor 8, the first and second non-return valves 18 and 19 and the throttle 22 are integrated, can be seen from FIGS. 2 and 3.

According to FIG. 2, the compressor 8 delivers directly to the air dryer inlet 39, from where the compressed air reaches a dryer bed 11 and is dried. From the air dryer outlet 40, the dried compressed air reaches the fourth pressure medium line 2 and/or the second pressure medium line 4, the dried air flowing through the open first non-return valve 18 before entering the second pressure medium line 4.

A dome 47, represented in the form of a tube with openings 48 to the dryer bed 11, is arranged in the dryer bed 11 and is connected via the second non-return valve 19, the seventh pressure medium line 20 and the throttle 22 to the second pressure medium line 4.

As shown in FIG. 3, if compressed air is directed from the pressure medium reservoir 12 via the second pressure medium line 4 to the air dryer 10, it reaches the dome 47 through the seventh pressure medium line 20, the throttle 22 and the second non-return valve 19, and from there passes via opening 48 into the dryer bed 11, from where it reaches the fourth pressure medium line 2 via the air dryer outlet 40, and from there reaches the outside. Through the particular arrangement of the dome 47 with the openings 48, the compressed air for regenerating the dryer bed 11 passes into the dryer bed 11 transversely to the normal flow direction, whereby the effectiveness of the regeneration process is increased.

It can be seen from FIGS. 2 and 3 that the elements shown separately in FIG. 1, namely the compressor 8, the air dryer 10, the first and second non-return valves 18 and 19, the seventh pressure medium line 20 and the throttle 22, are combined to form a space-saving constructional unit which can be produced in a simple and low-cost manner.

Figure 4:
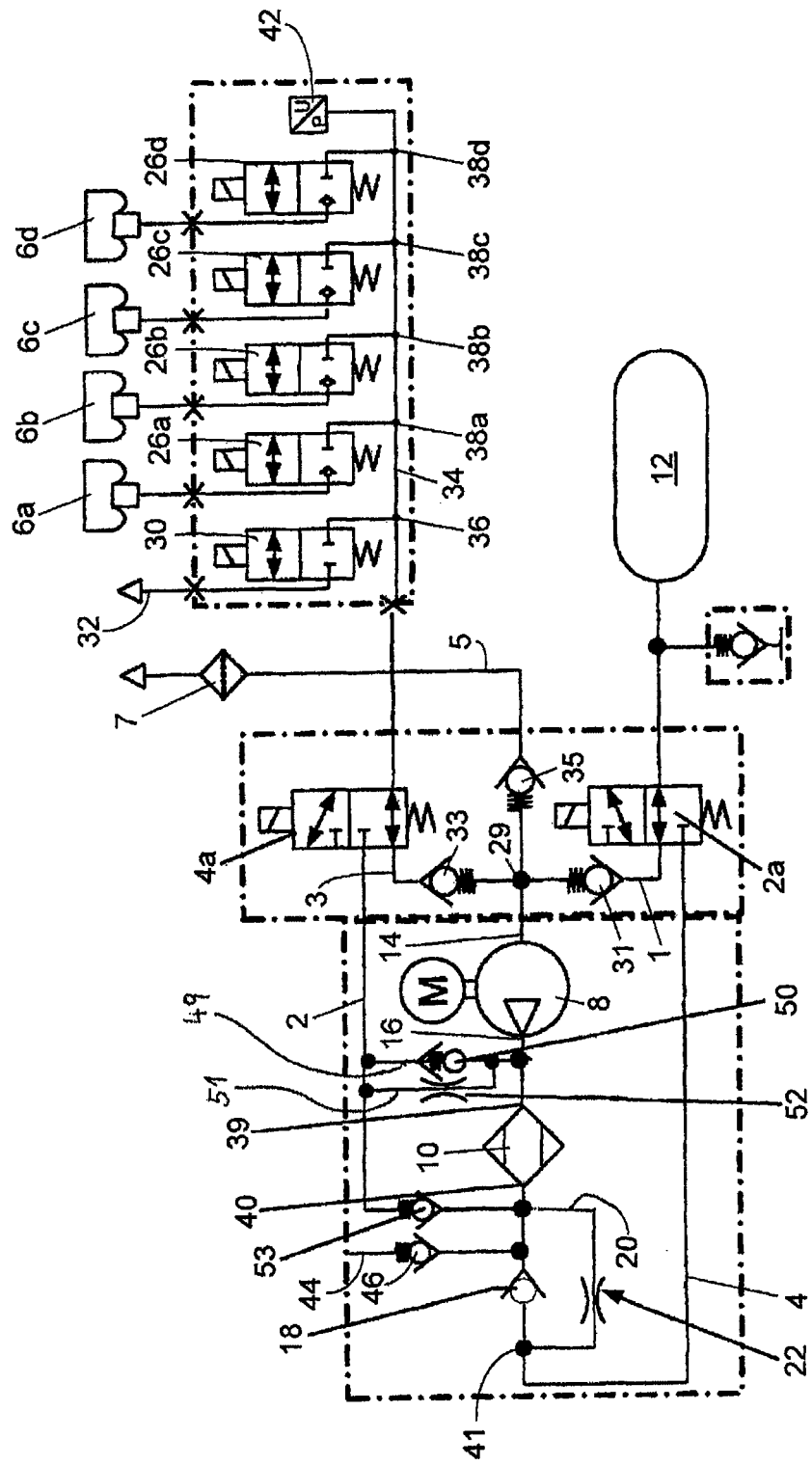
FIG. 4 is a pneumatic circuit diagram of the closed ride control system according to aspects of the invention with an additional pressure medium path from the pressure medium chambers to the pressure medium reservoir.

According to the modification shown in FIG. 4, only the throttle 22 is arranged in the seventh pressure medium line 20, and the line 20 opens into the dryer outlet 40. Arranged between the air dryer inlet 39 and the fourth pressure medium line 2 are an eighth pressure medium line 49 with a non-return valve 50 which blocks in the direction of the fourth pressure medium line 2, parallel thereto a ninth pressure medium line 51 with a throttle 52, and in addition a seventh non-return valve 53 between the air dryer outlet 40 and the fourth pressure medium line 2 upstream of the connections of the eight and ninth pressure medium lines 49 and 51. It is thereby made possible to establish a direct connection from the pressure medium chambers 6a to 6d to the pressure medium reservoir 10, the flow bypassing the compressor 8 but passing through the air dryer 10, in order to bring about a pressure equalization between the pressure medium chambers 6a to 6d and the pressure medium reservoir 12, and a drying of the compressed air when the pressure in the pressure medium reservoir 12 is lower than in the pressure medium chambers 6a to 6d.

The invention claimed is:

1. A closed ride control system for vehicles by which a vehicle body is suspended with respect to at least one vehicle axle, said system comprising:
   pressure medium chambers which are connected via branches to a first pressure medium line,
   a compressor,
   an air dryer which is arranged in a second pressure medium line,
   a pressure medium reservoir which is connected via the compressor to the pressure medium chambers in such a manner that:
   (a) pressure medium is configured to be transferred from the pressure medium reservoir via the compressor into each pressure medium chamber, a compressor inlet being connected to the pressure medium reservoir via a third pressure medium line and a first directional valve, and the compressor outlet being connected to one or more of the pressure medium chambers via a fourth pressure medium line and a second directional valve,
   (b) pressure medium is configured to be transferred from each pressure medium chamber via the compressor to the pressure medium reservoir, the compressor inlet being connected to one or more of the pressure medium chambers via a fifth pressure medium line and the second directional valve, and the compressor outlet being connected to the pressure medium reservoir via the second pressure medium line and the first directional valve, and that
   (c) a sixth pressure medium line which is connectable to the atmosphere and is connectable via a third directional valve, the second directional valve and the fifth pressure medium line to the compressor inlet, and is connectable via the second directional valve, the fourth pressure medium line and the first directional valve to the pressure medium reservoir,
   wherein a first non-return valve is arranged in the second pressure medium line between an outlet of the air dryer and the first directional valve in order to connect the outlet of the air dryer to the pressure medium reservoir, in that the fourth pressure medium line branches off from the second pressure medium line at the outlet of the air dryer and upstream of the first non-return valve, and in that a second non-return valve and/or a throttle is/are arranged in a seventh pressure medium line, wherein the seventh pressure medium line branches off from the second pressure medium line at a point between the first non-return valve and the first directional valve and opens in the air dryer, the second non-return valve blocking in the direction from the air dryer to a connection to the second pressure medium line.

2. The closed ride control system as claimed in claim 1, wherein only a throttle is arranged in the seventh pressure medium line.

3. The closed ride control system as claimed in claim 1, wherein the seventh pressure medium line is connected to the inlet of the air dryer.

4. The closed ride control system as claimed in claim 1, wherein the seventh pressure medium line is connected to a dryer bed of the air dryer.

5. The closed ride control system as claimed in claim 4, wherein the compressed air from the seventh pressure medium line can be directed into the dryer bed of the air dryer transversely to the drying flow direction of the air dryer.

6. The closed ride control system as claimed in claim 5, wherein the air dryer has an element which projects into the dryer bed and is connected to the seventh pressure medium line, the dome having at least one opening to the dryer bed.

7. The closed ride control system as claimed in claim 6, wherein the second non-return valve is arranged upstream of an inlet into the element.

8. The closed ride control system as claimed in claim 6, wherein the throttle is arranged upstream of an inlet into the element.

9. The closed ride control system as claimed in claim 1, wherein the third and fifth pressure medium lines are brought together at a point upstream of the compressor inlet, and in that a third non-return valve blocking in the direction of the first directional valve is arranged in the third pressure medium line, and a fourth non-return valve blocking in the direction of the second directional valve is arranged in the fifth pressure medium line.

10. The closed ride control system as claimed in claim 9, wherein a suction line is connected to a point via a fifth non-return valve blocking towards the atmosphere.

11. The closed ride control system as claimed in claim 10, wherein the directional valves are switchable in such a manner that aspiration of air from the atmosphere takes place only via the suction line and discharging of compressed air to the atmosphere takes place only via the sixth pressure medium line.

12. The closed ride control system as claimed in claim 1, wherein the first and second directional valves are in the form of 3/2-way valves and the third directional valve is in the form of a 2/2-way valve.

13. The closed ride control system as claimed in claim 1, wherein an eighth pressure medium line with a sixth non-return valve which blocks in the direction of the fourth pressure medium line, and parallel thereto a ninth pressure medium line with a throttle, and a seventh non-return valve, are arranged in the fourth pressure medium line between the connections of the eighth and ninth pressure medium lines located therein and the air dryer outlet.

\* \* \* \* \*